(No Model.)

C. E. WATERS.
HOLDBACK FASTENER.

No. 600,103. Patented Mar. 1, 1898.

Witnesses:
F. L. Ourand
Jos. L. Coombs

Inventor:
Cornelius E. Waters
Attorneys.

UNITED STATES PATENT OFFICE.

CORNELIUS E. WATERS, OF MUSKEGON, MICHIGAN.

HOLDBACK-FASTENER.

SPECIFICATION forming part of Letters Patent No. 600,103, dated March 1, 1898.

Application filed March 2, 1896. Renewed December 30, 1897. Serial No. 664,750. (No model.)

*To all whom it may concern:*

Be it known that I, CORNELIUS E. WATERS, a citizen of the United States, and a resident of Muskegon, in the county of Muskegon and State of Michigan, have invented certain new and useful Improvements in Holdback-Fasteners; and I do hereby declare that the following is a full, clear, and exact description of the invention, which will enable others skilled in the art to which it appertains to make and use the same, reference being had to the accompanying drawings, which form a part of this specification.

My invention relates to improvements in holdback-fasteners and connections for vehicles, whereby I secure important advantages with respect to efficiency in use.

The invention consists in a peculiarly-shaped fastener, adapted to be secured to the thills or shafts of a buggy, carriage, or other vehicle, comprising two curved arms lying in different planes, with a way or space therebetween and a loop at one end, and lugs provided with apertures for the passage of screws for securing them to the thills, in combination with a curved rod adapted to be connected with a breeching-strap and having a spherical head at the free end, as hereinafter fully described and claimed.

Figure 1:
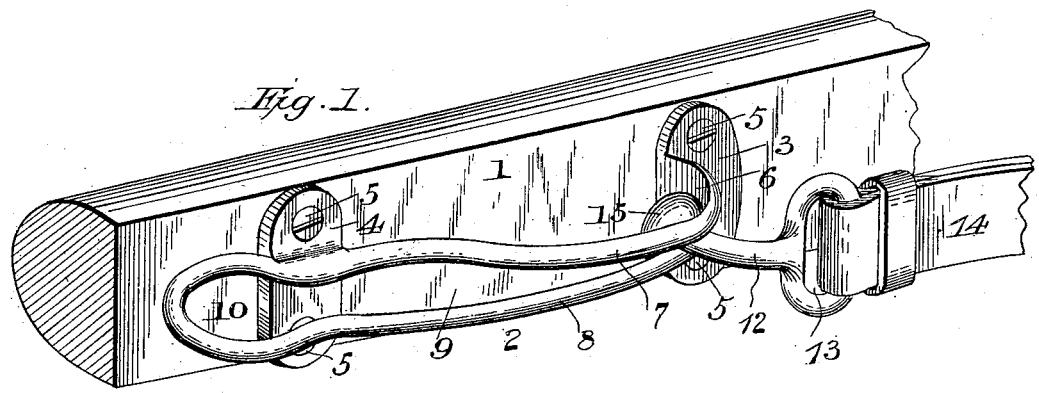
Figure 2:
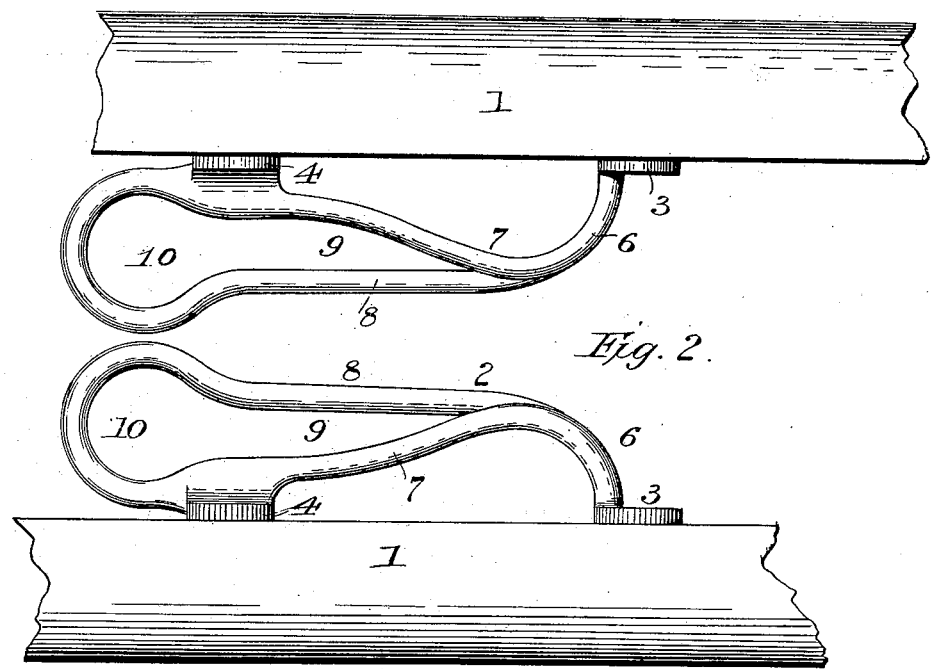
Figure 3:
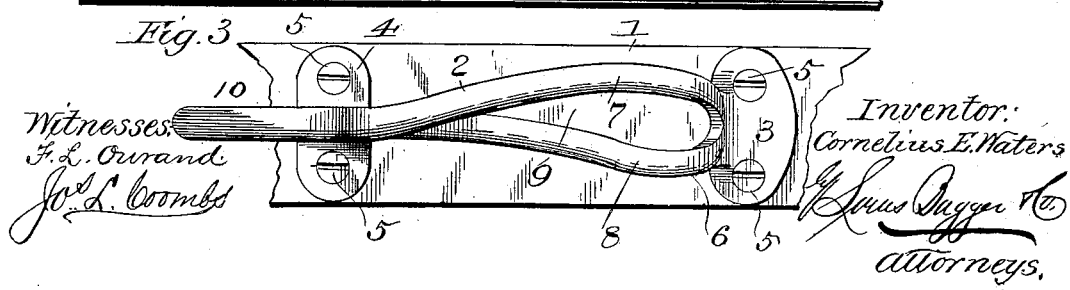

In the accompanying drawings, Figure 1 is a perspective view showing a portion of the right vehicle thill or shaft, a holdback-fastener secured thereto, and a headed rod or bolt engaging with said fastener and secured to a breeching-strap. Fig. 2 is a plan view showing right and left holdbacks or fasteners. Fig. 3 is a side view of the right-hand-holdback fastener.

In the said drawings the reference-numeral 1 designates the thill or shaft, and 2 the holdback-fastener secured thereto. This fastener is made of any suitable metal, preferably by casting, and comprises the lugs 3 and 4, formed with apertures for the passage of screws 5 for securing the fastener to the thills or shafts. Formed at right angles with the rear lugs 3 is an outwardly-extending arm 6, from which extend two arms 7 and 8. The arm 7 is curved outwardly and then inwardly and extends horizontally as far as the lug 4, while arm 8 curves outwardly for a short distance, forming a way 9. Said arm 8 then curves upwardly, changing the plane of the passage-way between the arms from a vertical to a horizontal one, and is then rounded, forming a loop 10, that also joins the lug 4.

The numeral 12 designates a rod or bolt formed at one end with a loop 13, by which it is secured to a breeching-strap 14. This rod or bolt is curved, as shown, and its free end is formed with a head 15, spherical in form. In practice there will be two of these fasteners employed, one for the right-hand thill and the other for the left-hand one.

The operation is as follows: In hitching the horse the head of the rod or bolt is inserted in the loop at the front end of the fastener and then pushed back to the rear, and by the peculiar construction of the space or passage-way between the arms the bolt will lie in a plane at a right angle to that which it occupied when being inserted in the loop. The rod or bolt will be free to turn in the space between the arms to accommodate it to the movements of the breeching-strap, but is prevented from being withdrawn by the spherical head. When the horse is unhitched and taken from the shafts, the head of the rod or bolt will move forward in the passage-way until it reaches the loop of the fastener, when it will automatically disengage itself therefrom.

Having thus fully described my invention, what I claim is—

1. As an improved article, a holdback-fastener adapted to be connected to the right and left thills of vehicle-shafts, consisting of the lugs, the rear one of which is provided with an outwardly-extending arm or portion, the curved arms connected therewith with a passage-way therebetween, one of which arms extends outwardly and then inwardly and is connected with the front lug, while the other arm extends upwardly and then horizontally past said front lug and is formed or bent into a loop joined to said lug, substantially as described.

2. In a holdback for vehicles, the combination with the fastener adapted to be secured to the thills or shafts, comprising the lugs, the outwardly-extending portion formed with the rear lug, the irregularly-curved arms connected therewith, with a passage-way therebetween, one of said arms being connected with the front lug while the other extends past said lug and is formed into a loop joined to the lug, of the curved rod or bolt adapted to be connected with a breeching-strap and the enlarged head thereof, substantially as described.

In testimony that I claim the foregoing as my own I have hereunto affixed my signature in presence of two witnesses.

CORNELIUS E. WATERS.

Witnesses:
 STEPHEN SPALDING,
 MAX LANGE.